(No Model.)

A. HOPTON.
MEANS FOR FIXING RUBBER TIRES ON WHEELS.

No. 604,862. Patented May 31, 1898.

Witnesses
A. J. Robins
H. MacCarthy

Inventor
Alfred Hopton
by
Benjamin Price
Attorney

UNITED STATES PATENT OFFICE.

ALFRED HOPTON, OF LONDON, ENGLAND.

MEANS FOR FIXING RUBBER TIRES ON WHEELS.

SPECIFICATION forming part of Letters Patent No. 604,862, dated May 31, 1898.

Application filed February 5, 1897. Serial No. 622,142. (No model.)

*To all whom it may concern:*

Be it known that I, ALFRED HOPTON, coach ironmonger, a subject of the Queen of Great Britain and Ireland, and a resident of 124 Euston road, London, England, have invented a certain new and useful Improved Method of and Means for Making and Fixing Rubber Tires to Wheels, of which the following is a specification.

My invention consists of a rubber tire for wheels of carriages and the like which is capable of being readily and securely fixed to a wheel and without the aid of special machinery for that purpose.

I take any ordinary section of rubber tires which may be used, but by preference make the tire with the base of a harder substance than the upper part, but so that it is sufficiently pliable to bend around a wheel. On the under side or base I make a groove or channel for the whole length of suitable shape to admit of a bolt to slide and be retained therein, by which means the tire is securely fixed to the wheel.

To enable my invention to be properly understood, I will describe the same by the aid of the accompanying drawings, in which—

Figure 1:
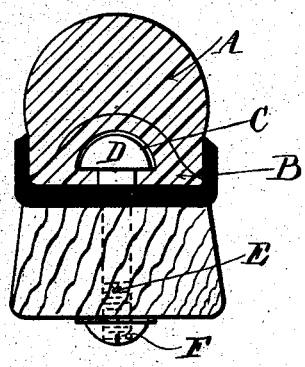
Figure 2:
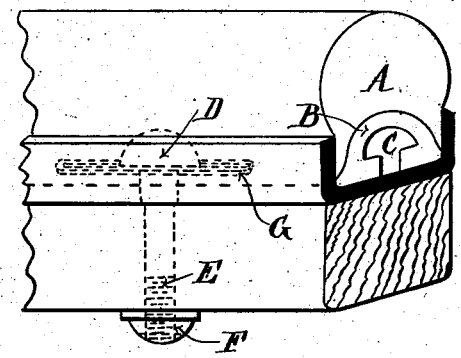
Figure 3:
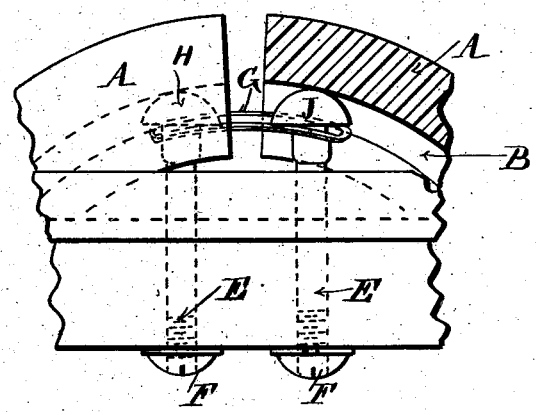
Figure 4:
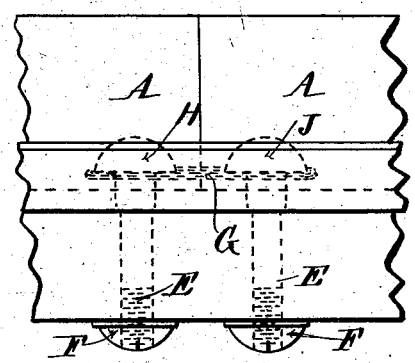

Figure 1 is a section of a tire made according to my invention and showing the same secured to the wheel. Fig. 2 is another view of a section of the said tire. Figs. 3 and 4 are views showing mode of bringing the ends of the tire together and keeping them securely fixed.

A is that part of the tire made of rubber of suitable kind.

B is the part which is by preference hardened by vulcanizing or other method.

C is the groove or channel running the entire length of the tire of suitable shape and size to admit the head and neck of a bolt D, so that the bolt D will move freely along the groove or channel.

In fitting the tire to the wheel I use any steel or iron channels or rims, preferably nearly square-sided, and attach these to the wheel in any suitable manner. To fix the tire in the metal channel or rim, I place in the groove or channel formed in the tire a sufficient number of bolts D with screwed end E to correspond to the number of holes which have been previously made in the wheel and metal channel or rim. These bolts may be provided with small loose metal plates or washers under the head of the bolt to bear upon the bottom of the groove formed in the tire. Commencing at the second bolt already placed in the groove I pass this through the hole in the wheel and metal channel or rim and tighten it with a nut F, preferably with a slotted head, and which may be burred over on the outside to insure against the possibility of its becoming loose. After securing this bolt I pull the tire and bring the next bolt to the hole already made to receive it and fix it as previously described. I proceed in this way all around the rim, and on reaching the ends or joint where the two remaining bolts are to be fixed I place in the groove of the tire, partly in each end of it, a slotted plate or washer G and slide therein the two bolts H and J, which have been temporarily removed for that purpose. I then insert these bolts into the corresponding holes in the wheel and metal channel or rim and by tightening up alternately in the manner previously described I draw the ends together and obtain a firm, clean, and strong joint.

Having now described my invention, what I claim as new, and desire to secure by Letters Patent, is—

In a wheel for a vehicle, a tire constructed of suitable material, provided with a groove throughout its length, and slot to accommodate the head and pin of a bolt, in combination with a wheel-rim made to conform in shape to the tire, and provided with holes to receive the bolts, the slotted plate G, and the bolts H and J arranged in the ends of the tire, substantially as described.

In witness whereof I have hereunto set my hand in presence of two witnesses.

ALFRED HOPTON.

Witnesses:
ALFRED FORDHAM,
WILLIAM ALEXANDER.